(12) United States Patent
Crocker

(10) Patent No.: US 6,959,432 B2
(45) Date of Patent: Oct. 25, 2005

(54) PROCESS AND SYSTEM FOR DEVELOPING MATHEMATICALLY VALIDATED OBJECT-ORIENTED SOFTWARE

(75) Inventor: David Crocker, Aldershot (GB)

(73) Assignee: Escher Technologies, Ltd., Aldershot (GB)

( * ) Notice: Subject to any disclaimer, the term of this patent is extended or adjusted under 35 U.S.C. 154(b) by 610 days.

(21) Appl. No.: 10/091,122

(22) Filed: Mar. 5, 2002

(65) Prior Publication Data

US 2002/0162091 A1 Oct. 31, 2002

(30) Foreign Application Priority Data

Mar. 8, 2001 (GB) .............................. 0105734

(51) Int. Cl.⁷ .............................................. G06F 9/44
(52) U.S. Cl. ........................ 717/126; 717/127; 717/116; 717/131; 714/38
(58) Field of Search .................. 717/126, 116, 717/127, 131, 121, 120, 106, 108, 130; 719/316, 315; 714/38; 716/1

(56) References Cited

U.S. PATENT DOCUMENTS

| | | | | |
|---|---|---|---|---|
| 5,390,325 A | * | 2/1995 | Miller .......................... | 714/38 |
| 5,555,201 A | * | 9/1996 | Dangelo et al. ................ | 716/1 |
| 5,699,310 A | * | 12/1997 | Garloff et al. ............... | 717/108 |
| 6,105,072 A | * | 8/2000 | Fischer ........................ | 719/315 |
| 6,151,701 A | * | 11/2000 | Humphreys et al. ......... | 717/130 |
| 6,275,976 B1 | * | 8/2001 | Scandura ..................... | 717/120 |
| 6,289,502 B1 | * | 9/2001 | Garland et al. ............. | 717/104 |
| 6,336,148 B1 | * | 1/2002 | Doong et al. ................ | 719/316 |
| 6,442,748 B1 | * | 8/2002 | Bowman-Amuah ......... | 717/108 |
| 6,601,192 B1 | * | 7/2003 | Bowman-Amuah .......... | 714/38 |
| 6,615,199 B1 | * | 9/2003 | Bowman-Amuah .......... | 706/50 |
| 6,678,882 B1 | * | 1/2004 | Hurley et al. ................ | 717/121 |
| 6,681,383 B1 | * | 1/2004 | Pastor et al. ................. | 717/126 |
| 6,698,012 B1 | * | 2/2004 | Kossatchev et al. ......... | 717/126 |
| 6,789,252 B1 | * | 9/2004 | Burke et al. ................. | 717/100 |

OTHER PUBLICATIONS

TITLE: Inheritance of Interface Specifications (Extended Abstract), author: Leavens, ACM, Aug. 1994.*
TITLE: Modular Reasoning in the Presence of Subclassing, author: Stata et al, ACM, 1995.*
TITLE: Mapping a Functional Specification to an Object–Oriented Specification in Software Re–engineering, author, Periyasamy et al, ACM, 1996.*
TITLE: OOSPEC: An Executable Object–Oriented Specification Language, author: Paryavi et al, ACM, 1995.*
Castelluccia, C. et al. "Generating Efficient Protocol Code from an Abstract Specification." IEEE/ACM Transactions on Networking, vol. 5, No. 4 (1997) pp 514–524.
Gotzhein, R. et al. "Improving the Efficiency of Automated Protocol Implementation Using Estelle." Computer Communications 19 (1996) pp 1226–1235.

* cited by examiner

*Primary Examiner*—Chameli C. Das
(74) *Attorney, Agent, or Firm*—Ladas & Parry (57) ABSTRACT

A process and a system are used to verify that an object-oriented software component described in an extended programming language behaves correctly with respect to an abstract data model and specifications of the operations that may be performed on it The process and system also verify for an assembly of components that whenever an operation on a component is invoked, the correct conditions specified for that operation and component exist, and that specified properties hold for a component of the assembly.

24 Claims, 3 Drawing Sheets

PROCESS AND SYSTEM FOR DEVELOPING MATHEMATICALLY VALIDATED OBJECT-ORIENTED SOFTWARE

BACKGROUND OF THE INVENTION

This invention relates to a process and system for developing mathematically validated object oriented software.

Most computer programs contain bugs (i.e. software errors). In general it may be said that a program contains a bug if the executing program fails to meet the user requirements that it was intended to satisfy. Bugs may be introduced at various stages of the software development process:

1. The user's requirements may not have been correctly understood and documented;
2. The system specification that was written may not perform in accordance with the documented user requirements;
3. The system design may fail to conform to the specification;
4. Components used to implement the design may by assembled in ways that violate the safe conditions for use of the components;
5. Components may have been incorrectly programmed and so fail to perform correctly even when assembled correctly;
6. Correctly written components may have been translated incorrectly to machine language.

It is desirable to provide early detection of bugs introduced in all of these stages and to provide final product certainty, or near certainty, that the program will behave according to its specifications. To this end, the following are described in the prior art: specification languages (including object-oriented specification languages); object-oriented programming languages; a system that validates older (non-object-oriented) specifications and program descriptions by generating proof obligations; and automated proof techniques.

However, the prior art in this field does not address the problems of specifying and verifying the behaviour of programs using object-oriented techniques including inheritance and dynamic binding.

SUMMARY OF THE INVENTION

It is an object of the invention at least to ameliorate these difficulties.

According to a first aspect of the invention there is provided a process for developing mathematically validated object oriented software comprising the steps of: a) writing an abstract specification of a class, methods and expected properties of a component of the software; b) checking the abstract specification for errors and verifying that the class has the expected properties; c) generating executable code for the class from the abstract specification; d) running and evaluating the executable code to check that the code meets requirements other than a required speed of performance; and e) evaluating the speed of performance when handling data sets commensurate to the size of data sets the software component is required to handle.

Preferably, the step c) of generating executable code includes the further step, where the specification is too complex to generate executable code directly, of refining the method by specifying a series of operations to be undertaken, to produce a refined method and verifying that the refined method behaves in accordance with the abstract specification before generating executable code.

Conveniently, the step d) of running and evaluating the executable code, includes the farther step, where the code does not meet requirements, of identifying the defects and correcting the abstract specification and then repeating the process from step b).

Advantageously, the step e) of evaluating the speed of performance, includes the further steps, where the speed of performance is inadequate, of restructuring the data maintained by the class, adding variable declarations for the restructured data, and refining the methods and constructors to take account of the restructured data and generating executable code.

Conveniently, the step e) of evaluating the speed of performance, includes the further steps, where the speed of performance is inadequate of refining the method to produce a refined method and verifying that the refined method meets the specifications of the original method, and generating executable code.

Advantageously, the abstract specification includes a name of the class, a list of other class or classes and/or interfaces that said class inherits from, an abstract model of data maintained by the class, abstract specifications of the methods and constructors of the class, and theorems of expected behaviour of the class and the methods and constructors.

Advantageously, the abstract model of data includes declarations of abstract variables and may optionally include class invariants which are conditions concerning values of the abstract variables that are expected always to be true and declarations of abstract methods private to the class that assist in defining the class invariants and what other methods achieve.

Conveniently, the abstract specifications of the methods and constructors of the class include: a method name; a method parameter list; and a definition of what the method achieves.

Advantageously, the abstract specifications of the methods and constructors of the class further include one or more of: a method result type; a precondition that is required to hold whenever the method is called; a post-assertion description of conditions expected to hold when the method returns.

Conveniently, the step of refining the method includes providing an algorithm of program statements including postcondition statements.

Conveniently, a description of the class is divided into regions: an abstract region containing the abstract data model and also private methods and constructors referred to elsewhere in specifications of the class; an internal region containing re-implemented data and redundant data and also private methods and constructors referred to in re-implementations of other methods; a confined region of methods and constructors that are used only within the class and within other classes that inherit from that class; and an interface region of methods and constructors accessible to any program or components that use instances of the class.

Advantageously, the step c) of generating executable code includes the steps of: i) tokenising the abstract specification to form a token stream and building a representation of the abstract specification; ii) parsing the token stream; iii) binding identifiers and operators to declarations; iv) converting the specifications and expressions contained therein to standard forms; v) generating a new instance of each variable at every point at which the variable is changed, effectively replacing each variable by a succession of constants; vi) generating proof obligations to represent requirements for program correctness; vii) proving the obligations; viii) using the abstract specification to generate a test harness or a set of test data for testing speed of performance; ix) generating code statements to implement the specification where no code is provided; x) translating the code statements to easily translatable form; xi) translating the easily translatable form to an output language.

According to a second aspect of the invention there is provided a system for developing mathematically validated object oriented software comprising: a) means for writing an abstract specification of the class, methods and expected properties of the software component; b) means for checking the abstract specification for errors and verifying that the class has the expected properties; c) means for generating executable code for the class from the abstract specification; d) means for running and evaluating the executable code to check that the code meets requirements other than a required speed of performance; and e) means for evaluating the speed of performance when handling data sets commensurate to the size of data sets the software component is required to handle.

Conveniently, the means for generating executable code further includes, where the specification is too complex to generate executable code directly, means for refining the method by specifying a series of operations to be undertaken, to produce a refined method and for verifying that the refined method behaves in accordance with the abstract specification before generating executable code.

Advantageously, the means for running and evaluating the executable code, includes the further means, where the code does not meet requirements, for identifying the defects and for correcting the abstract specification and then for repeating checking the abstract specification for errors and verifying that the class has the expected properties Conveniently, the means for evaluating the speed of performance, further includes, where the speed of performance is inadequate, means for restructuring the data maintained by the class, adding variable declarations for the restructured data, and refining the methods and constructors to take account of the restructured data and generating executable code.

Advantageously, the means for evaluating the speed of performance, further includes, where the speed of performance is inadequate, means for refining the method to produce a refined method and verifying that the refined method meets the specifications of the original method, and generating executable code.

Conveniently, the abstract specification includes a name of the class, a list of other class or classes and/or interfaces that said class inherits from, an abstract model of data maintained by the class, abstract specifications of the methods and constructors of the class, and theorems of expected behaviour of the class and the methods and constructors.

Advantageously, the abstract model of data includes declarations of abstract variables and may optionally include class invariants which are conditions concerning values of the abstract variables that are expected always to be true and declarations of abstract methods private to the class that assist in defining the class invariants and what other methods achieve.

Conveniently, the abstract specifications of the methods and constructors of the class include: a method name; a method parameter list; and a definition of what the method achieves.

Advantageously, the abstract specifications of the methods and constructors of the class farther include one or more of: a method result type; a precondition that is required to hold whenever the method is called; a post-assertion description of conditions expected to hold when the method returns.

Conveniently, the means for refining the method includes means for providing an algorithm of program statements including postcondition statements.

Conveniently, a description of the class is divided into regions: an abstract region containing the abstract data model and also private methods and constructors referred to elsewhere in specifications of the class; an internal region containing re-implemented data and redundant data and also private methods and constructions referred to in re-implementations of other methods; a confined region of methods and constructors that are used only within the class and within other classes that inherit from that class; and an interface region of methods and constructors accessible to any program or components that uses instances of the class.

Advantageously, the means for generating executable code includes means for: i) tokenising the abstract specification to form a token stream and building a presentation of the abstract specification; ii) parsing the token stream; iii) binding identifiers and operators to declarations; iv) converting the specification and expressions contained therein to standard forms; v) generating a new instance of each variable at every point at which the variable is changed, effectively replacing each variable by a succession of constants; vi) generating proof obligations to represent requirements for program correctness; vii) proving the obligations; viii) using the abstract specification to generate a test harness or a set of test data for testing speed of performance; ix) generating code statements to implement the specification where no code is provided; x) translating the code statements to easily translatable form; xi) translating the easily translatable form to an output language.

The invention provides the advantage that an object-oriented computer programming language is provided with the usual facilities found in such programming languages and additionally facilities to specify the abstract data model represented by a class, the properties that a class method and all methods that override it are required to satisfy, the precise overall behaviour of a class method or constructor, the conditions under which a method may be safely invoked, invariant expressions for loops, variant expressions for loops and recursive methods, functions and other methods that do not form part of the program but are helpful in describing its behaviour, and aspects of behaviour that are expected in consequence of the specifications. A computer system is described to process a program description written in this language and to carry out validation and to generate test data and a set of theorems (known as "proof obligations") that must be true for the program to behave as described. Where the user has described required behaviors but has not provided program statements to implement them, the system attempts to generate suitable program statements and optionally proof obligations that these statements behave as specified, just as if the user had provided them. The computer system or another system or a plurality of systems is used to attempt to prove the proof obligations, with or without human assistance.

The invention provides the further advantages of the use of a single language to express both specifications and program statements using object-oriented concepts.

The invention also provides the ability to embed theorems in a program to represent the user's requirements or expectations of the system's behaviour.

Additionally, an embodiment of the invention has the advantage of the declaration and use of a method postcondition divided into two separate parts. The first part defines the totality of variables, return values and other state components modified by the method and the required relationship between the final values of these entities and other parts of the system state. When the method is overridden by a similarly named method in a descendent class, this part is not inherited by the overriding method The second part of the postcondition, subsequently referred to in this document as post assertion, comprises those required relationships between the final values of state components that are inherited by any overriding method. This second part is required to be a logical consequence of the first part, so that the first part alone is sufficient to define how the method changes the state. The second part is generally weaker than the first part because it can only describe relationships that apply in all the methods into which it is inherited. There are at least two advantages to the use of this two-part postcondition instead of a single, fully inherited postcondition. First, when a method call is made and the call can be statically bound to a method both parts of the postcondition can be assumed after the call instead of just the weaker inherited part. Second, it is often possible to generate code automatically from the first part of the postcondition; whereas the inherited part is typically too weak and imprecise to support automatic code generation.

An additional advantage is the construction of a complete system that is capable of taking the development process right the way through from object-oriented specifications to code in a standard programming language, with the ability to provide a mathematical proof that the code behaves according to the specifications (subject only to uncertainty in the semantics of the standard programming language).

BRIEF DESCRIPTION OF THE DRAWINGS

A specific embodiment of the invention will now be described by way of example with reference to the accompanying drawings, in which.

DETAILED DESCRIPTION OF THE INVENTION

Overview of the Process

The invention uses a new computer language to express both program specifications and program statements in a single document. The language uses the same notation for the detail of both specifications and statements; further, this notation is designed to be similar to notations used in known programming languages, so that it is easy for software developers to learn.

A software component is represented by one or more classes described in the language. For each class the following process is performed, as illustrated in outline in FIGS. 1 and 2.

Figure 1:
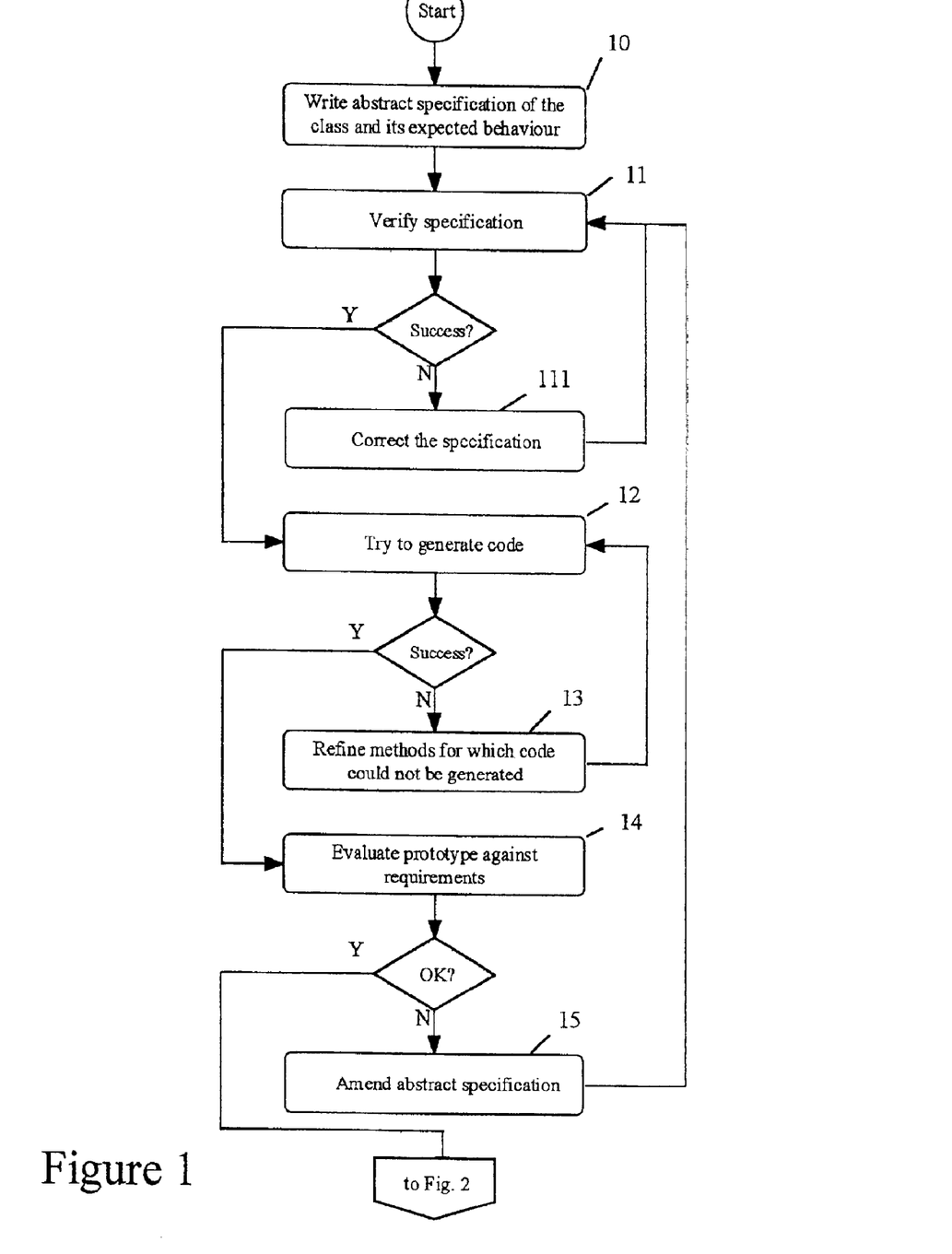
FIG. 1 is a flowchart showing a first part of the process of developing software using the invention.
Figure 2:
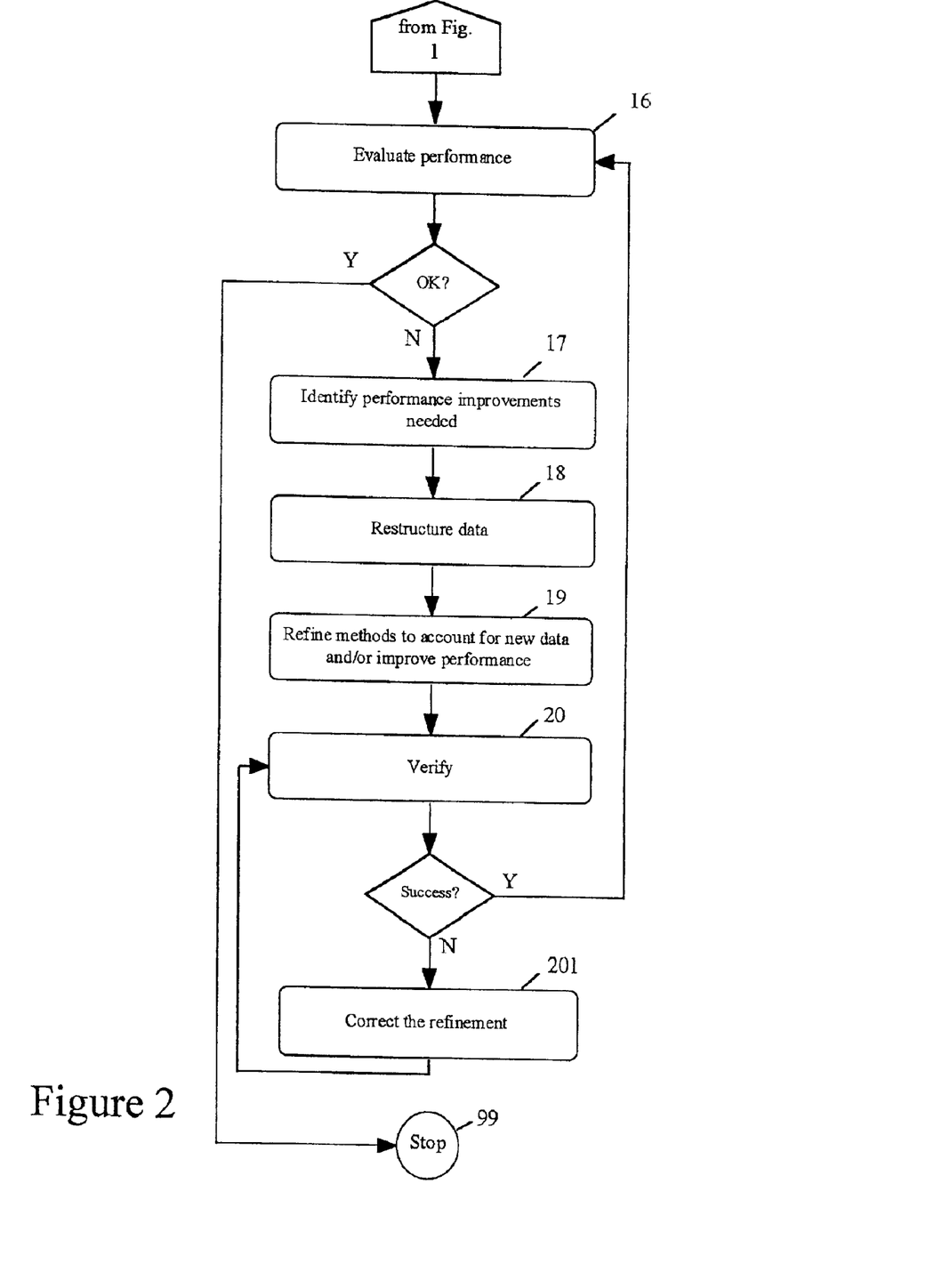
FIG. 2 is a flowchart showing a second part of the process of developing software using the invention.

1. Using the new language, an abstract specification of the class, its methods, and expected properties is written, step 10.
2. Using a computer system, the description is checked for errors and it is verified, step 11, that the class has the expected properties, if not the specification is corrected, step 111.
3. Using the computer system, executable code is generated, step 12, for the class from its abstract specification.
4. Wherever the system is unable to generate code for a method of the class, because the specification is too complex, the method is refined, step 13, (i.e. a series of steps to be taken is specified). Using the system it is verified that an algorithm representing the refined method will behave according to the specification, and then the system is used to generate code.
5. The code is run and evaluated, step 14, to ensure that the code meets all user requirements apart from the required level of performance. If the generated code does not meet the requirements, any defects are identified and the abstract specification corrected, step 15. The process is then repeated from step 11.
6. The performance of the code when handling data sets of a realistic size is evaluated, step 16. If the performance is adequate, development is finished, step 99.
7. Alternatively, areas where improved performance is needed for the final version are identified, step 17, to decide whether it is necessary to restructure the data maintained by the class to improve the speed of the operations that are performed on the data.
8. If the data does need to be restructured, step 18, variable declarations for the new data are added together with a description of how the new data represents the original abstract data model.
9. Where methods are executing too slowly or they operate on data that has been restructured, the method is refined, step 19, by specifying an algorithm to achieve the desired result.
10. The computer system is used to verify, step 20, that the refined methods operating on the restructured data meet the original method specification, bearing in mind how the restructured data that the algorithm operates on maps to the abstract data to which the specification refers, and generate code. If not, the refined method is corrected, step 201.
11. The process is repeated from step 16 to re-evaluate the performance.

The steps will now be described in more detail.

Writing the Abstract Specification, Step 10

The abstract specification of a class comprises the following elements:

The name of the class.

A list of other class or classes and/or interfaces from which the class inherits.

An abstract model of the data maintained by each class. This model is described as simply as possible without regard to how the data will be stored at execution time and without storing redundant data (i.e. data that can instead be calculated from other data already in the abstract model).

Abstract specifications of the methods and constructors of the class (but not program statements to implement them). Methods and constructors are grouped into four regions. Methods and constructors that are referred to from elsewhere in the specification but are not intended to be available from outside the class are placed in the abstract section along with the abstract data model. The internal region is initially empty. The confined region is for methods and constructors that are used only within the class and within other classes that inherit from it. The interface region is for methods and constructors that are accessible to any program or component that wishes to use instances of the class.

Theorems describing the expected behaviour of the class and its methods (e.g. the expected consequences of calling several methods in sequence).

The abstract data model comprises:

Declarations of abstract variables.

Class invariants (optional), which are conditions concerning the values of the abstract variables that are always expected to hold.

Declarations of abstract methods (optional). These are methods private to the class that assist in defining the class invariants and what other methods achieve.

Each abstract specification of a method has the following elements:

Name.

Parameter list.

Result type (where applicable).

Precondition (optional), which is a condition that is required to hold whenever the method is called.

What the method achieves. For a function or operator, this is a definition (either explicit or implicit) of the values returned. For a procedure, this is a postcondition, which is a construct describing what variables and/or parameters have changed when the procedure returns and what the new values are (explicitly or implicitly).

Post-assertion (optional), which is a description of conditions expected to hold when the method returns as a consequence of the description of what the method achieves.

Variant (only needed if the method is recursive), which is an expression of a finite type with a defined lower bound. If the expression is of a numeric type, the lower bound is taken to be zero; otherwise it is the lowest value of the type.

Each abstract specification of a constructor has the following elements:

Parameter list.

If the class inherits others, the values of the abstract data variables of the inherited instance of each inherited class.

Precondition (optional).

Postcondition describing the value of the constructed class instance.

Post-assertion (optional)

In addition to declaring methods and constructors that will actually be used during program execution, it is also possible to declare methods and constructors that are flagged such that no code will be generated for them. The purpose of declaring these ghost methods is to describe properties of the class that are referred to in the specifications but will not be evaluated at execution time. It is not permitted to call a ghost method from a program statement.

Every built-in operator and library class method or constructor provided by the language also has defined specifications, which are made available to the computer system.

Checking the Description for Errors

Details of the performance of this step 11 are described below.

Generating Code for the Class

Details of this step 12, are described below.

Refining Methods for Which the System is Unable to Generate Code, Step 13

In order to refine the methods an algorithm is provided in the form of program statements. As well as types of program statement similar to those of known programming languages, a new form of statement, called a postcondition statement, may be used. A postcondition statement is similar to a method postcondition (i.e. a description of what variables are to be changed and an explicit or implicit description of their new values). By using postcondition statements, it is not necessary to break each step of the algorithm into individual executable statements, rather an entire program step may be represented by a postcondition statement. The computer system attempts to generate code to satisfy the postcondition statement in the same way that it attempts to generate code for methods specified by postconditions. It is possible that the system will fail to generate code for a postcondition statement (although generating code for one step in the algorithm will generally be simpler than for the postcondition of the entire method, so successful code generation is more likely), in which case the user can provide an algorithm for performing the step (i.e. break it down into smaller steps). The system verifies that the algorithm achieves the desired result (see the later description).

Evaluating the Functionality of the Prototype, Step 14

There is always the possibility that the requirements of the user of the component (or an assembly of components) have not been correctly understood and expressed in the language. It is therefore useful to supply the prototype component to the customer for that component, or to assemble a collection of prototype components into a system for evaluation by an end user. If the prototype is found not to meet the requirements (ignoring for the time being the speed at which the prototype executes), this indicates that the specification needs to be corrected, step 15.

Evaluating the Performance of the Prototype, Step 16

To check whether the prototype executes fast enough, it will normally be necessary to generate a realistic quantity of test data. One way of doing this is to use the system to generate such data from the specifications. The system may also be used to generate a test harness (i.e. a program to exercise the component and verify that the expected results are produced). If the prototype is fast enough in all respects, development is complete.

Identifying the Areas Where Improved Performance is Needed, Step 17

This can be done by determining which class methods are involved in operations that are taking too long. Profiling can be used to determine which of those methods are taking up most of the time. It may also be fairly obvious to the developer which methods will show a substantial deterioration in performance with increasing amounts of data, in the absence of an optimised algorithm.

The developer will use his/her experience to decide whether a method can be accelerated sufficiently just by using a better algorithm, or whether the data needs to be restructured also.

Restructuring the Data, Step 18

Data may be restructured in two ways:

Redundant data may be added. For example, if it is frequently required to evaluate some function of the primary data, then after the first time this function is evaluated, the result can be stored for use in the future. As another example, an index to a primary data structure could be maintained in order to facilitate fast searching of the primary data structure.

One or more abstract variables can be replaced by implementation variables. For example, a list of names might be replaced by a hash table, or the polar coordinates of a point might be replaced by the Cartesian coordinates.

In either case, the description of the abstract data is retained and the new variables are declared in the internal section of the class definition. Also declared in the internal section are:

For every redundant internal variable, a class invariant describing its relationship to the other variables;

For every abstract variable that is being replaced by one or more internal variables, a function (known as a retrieve function) to calculate the value of the hypothetical abstract variable from the internal variables.

Refining Methods to Improve Performance or to Take Account of Data Restructuring, Step 19

This is essentially the same process as was described earlier for refining methods for which the system was unable to generate code; except that the program statements (including any postcondition statements) may refer to internal variables but not to abstract variables that have been replaced by internal variables.

Description of the Computer System that Processes the Language

Figure 3:
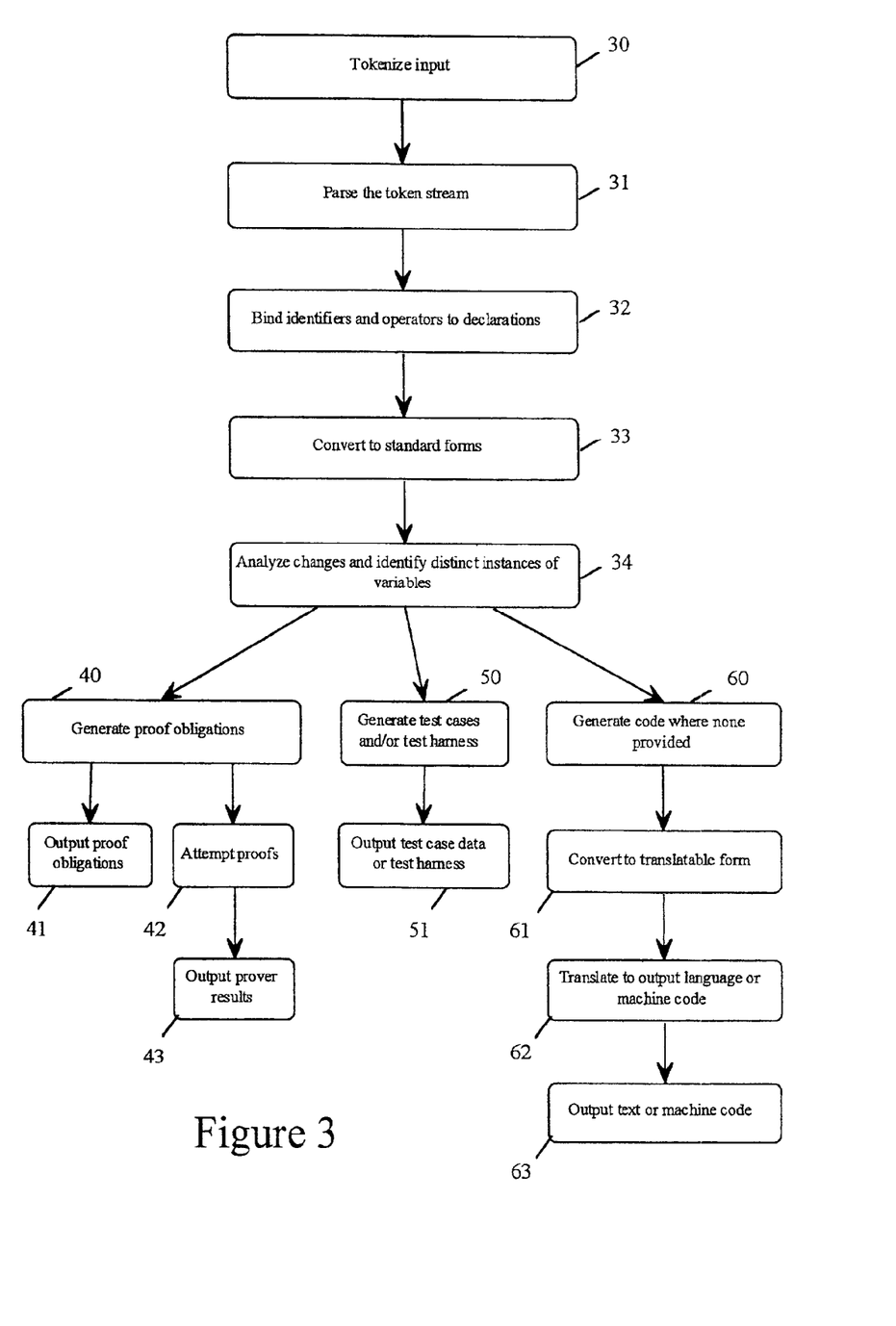
FIG. 3 is a flowchart for processing a source file containing program text in a new language.

The source file containing program text in the new language is processed as shown in FIG. 3.

Tokenising Step 30, Parsing Step 31, Binding Step 32 and Standardization Step 33

These steps are performed as they would be in a conventional compiler for a programming language except that the additional specification information is checked for syntactic and semantic errors and stored alongside the normal program information.

Instancing, Step 34

This step generates a new instance of each variable at every point that the variable is changed, effectively replacing each variable by a succession of constants (one for each time the variable is changed). This makes it easier to generate proof obligations, step 40; it also facilitates optimisation when translating the program statements to machine code or another programming language and makes certain types of programming error easier to detect (e.g. use of uninitialised variables).

Loops are treated specially. Within a loop body, for each variable that is changed, instances are generated for the start of the loop body, the end of the entire loop, and at each point in the loop body where the value of the variable is changed. It is not necessary to generate a new instance for each iteration of the loop.

Generating Proof Obligations, Step 40

Whenever it is desired to validate the program, proof obligations are generated, step 40, and output, step 41, to represent the following requirements for program correctness:

1. For every expression in the specification, the precondition for the expression to be well-formed is satisfied (for example, if the expression involves a call to a function or other method, the precondition of the called function or method is satisfied when the parameters of the call are substituted in the precondition).
2. The specification of every class constructor defines each data member of the constructed object before using that member or completing.
3. The specification of every class constructor defines a value for the constructed object that satisfies the class invariant.
4. Methods that modify objects preserve the class invariants of the modified objects.
5. Where a method declaration in a derived class overrides a method inherited from a parent class: if a precondition is declared for the overriding method, the overridden precondition implies the overriding precondition; if a post-assertion (previously referred to in this document is the second part of the post condition) is declared for the overriding method, this postassertion implies the overridden postassertion.
6. For each recursive method, a method variant has been declared and the method variant has a legal value on entry.
7. For each recursive method, for every path that starts at the entry point of that method and ends at a recursive call to the same method (without passing through any other recursive calls to the same method), the method variant calculated immediately on re-entering the method at the end of the path is less than the variant calculated at the start of the path.
8. Methods that return one or more output parameters always set the values of all returned parameters before completing.
9. Every method post-assertion (whether declared directly or inherited) is satisfied whenever the postcondition of the method is satisfied.
10. Assertions embedded in postconditions or expressions are satisfied.
11. Where a method modifies one or more parameters (including the current-object parameter), whenever the method is called then the objects corresponding to the modified parameters are distinct from each other and from any other objects modified by the method.
12. Each theorem declared by the user is true.
13. Where a sequence of program statements is provided to implement a method specification, at each return statement (including any implicit return statements, e.g. at the end of the sequence), the state of variables and the returned value (if applicable) at that point conforms to the specification of what the method achieves, considering the mapping between the actual data on which the statements operate and the abstract data model referred to in the specifications.
14. At the beginning of every loop, the loop invariant is satisfied and the loop variant has a legal value.
15. In each iteration of every loop, the loop invariant is preserved and either the loop termination condition is reached or the value of the loop variant is decreased and remains legal.
16. At every assertion statement, the condition asserted is true.

When generating the proof obligations, step 40, for any part of a method specification apart from the precondition, the precondition is assumed to be satisfied. Additionally, it can always be assumed that class invariants are satisfied, except in the definition of a class invariant or any method that a class invariant directly or indirectly refers to; or in the statements that implement a constructor or a method that modifies objects of its own class.

When generating proof obligations for a sequence of statements (whether introduced as a method refinement by the developer or generated automatically from specifications), the system tracks the program state forwards through the sequence. At the beginning of the sequence, the known program state comprises the method precondition and class invariants. This program state forms the assumptions for proof obligations generated for the first statement in the list. The system then computes the changes to the known state that would be caused by executing the first statement. The resulting state forms the assumptions for proof obligations generated for the second statement, and after computing the changes to this state caused by executing the second statement, the third statement may then be processed in the same way; and so on until the end of the statement list is reached.

Because new variable instances are generated whenever a variable is changed, all changes to the program state take the form of additions. The nature of these additions will now be described.

For an assignment statement, the information is added that the new instance of the variable being assigned has a value equal to the expression on the right-hand side of the assignment.

For a conditional statement, the program states are determined at the start of each branch. These are calculated by adding to the initial state the certainty that the condition required to reach the branch is true. For example, for a simple if-then-else statement, adding the condition following IF to the initial state gives the state at the start of the THEN branch, while adding the inverse condition gives the state at the start of the ELSE branch.

We also need to determine the state when all branches have merged at the end of the conditional statement. To do this we merge the states calculated at the end of each individual branch using the form:

condition for branch 1 AND state at end of branch 1

OR condition for branch 2 AND state at end of branch 2

OR condition for branch 3 AND state at end of branch 3

. . .

For a simple if-then-else construct this reduces to:

(condition AND state at end of THEN-part) OR ((NOT condition) AND state at end of ELSE-part)

Where a variable is modified by some, but not all, branches of a conditional statement, in order to match instances of variables at the end of the conditional statement, branches that do not modify the variable are treated as if they included a dummy assignment statement that reassigns the variable its current value.

Where a branch of a condition does not fall through (e.g. because it contains a RETURN statement), that branch is omitted when computing the state at the end of the conditional statement.

For a loop statement, it is necessary to calculate the state at the start of the loop body and the state after the loop has terminated. For the start of the loop body, the information that the loop WHILE condition is true and the invariant is true is added to the initial state (using, for each modified variable, the instance allocated for loop start in all cases). For the state after loop termination, the information that the WHILE condition is false and the invariant is true is added to the initial state (using, for each modified variable, the instance allocated for loop end).

In generating the full set of proof obligations, for each class not only the methods that are declared within its declaration, are examined, but also the methods that are inherited from the method's ancestors and not overridden. Thus, for every method, a set of proof obligations is generated in the context of the class in which it was declared and in the context of each class that inherits that method and does not override the method. This avoids the possibility that a method that performs correctly in the class in which it was defined no longer performs correctly when the method is inherited by another class, a situation which easily arises (e.g. when the method needs to take account of new data declared in the inheriting class but the developer forgot to override the inherited method).

Proving the Obligations, Step 42

Each proof obligation generated by the system is passed to an automatic or semi-automatic theorem prover running either on the same computer system or another system or systems, which attempts, step 42, to prove it. The prover may use various techniques including: term rewriting, equational logic, resolution and its derivatives, tableaux, sequent calculus and induction.

For each proof obligation that the prover is unable to prove, the system generates, step 43, a diagnostic message indicating:

The origin of the obligation (i.e. the location of the specification fragment or statement that caused the message to be generated and the nature of the condition that the obligation represents);

An indication whether the prover has found that the obligation is definitely unprovable (indicating a definite error in the specification fragment or statement) or has not been able to prove or disprove the obligation (indicating that there might be an error in the specification fragment or statement);

An indication of what additional conditions are required to hold for the obligation to be easily provable (to help the user understand what may be wrong with the specification fragment or statement).

Generating a Test Harness or a Set of Test Data, Step 50

The specifications are also used to generate programs that invoke the methods of the program under construction with test data, such test data being chosen to conform to the method preconditions. The expected result for each data set is calculated and the test program generated so as to check for this result, and the test case data or test harness output, step 51.

Generating Code to Implement the Specification Where No Code Was Provided, Step 60

Generating code automatically from postconditions is accomplished using the following techniques:

An attempt is made to match the postcondition against the members of a set of standard postconditions forms. If a match is found, a corresponding rule is used to generate code.

Equational reasoning is used to turn an implicit postcondition into a set of formulae that provide values for the variables that are allowed to change. Code is generated to calculate these formulae.

A fuzzy match is sought between the postcondition and other postconditions for which corresponding code is available. For any such match, the corresponding code is generalised and/or mutated in various ways and the system attempts to establish conditions under which this code satisfies the postcondition.

Transforming Code Statements to Easily-Translatable Form, Step 61

This stage is used to convert statements in the language of the system to other statements in the same language or a slightly extended language, such that the resulting statements are simpler or more closely mirror the statement types available in the target language. Optimisations such as common subexpression elimination, strength reduction and loop unfolding can also be done in this stage. The user is given the option of verifying that the transformed code still meets the original specifications, in order to guard against unsafe optimisations. The system may optionally generate additional statements to check at execution time that the conditions represented by unproven proof obligations hold.

Translating Statements to the Output Language, Step 62

This step is performed mostly as it would be in a conventional compiler. Variables declared in the abstract data model, but replaced by variables in the internal section due to data restructuring, are ignored as no storage is needed for them. The user may be given the option of reproducing the original specifications as comments in the output stream, step 63.

Reducing the Impact of Aliasing

One source of program errors occurs where a method modifies two or more objects of which at least one object is passed as a parameter, and the method being called with parameters such that two of the objects the method modifies are aliased (i.e. they are references to the same object). The proof that the method behaves as expected relies on the objects the method modifies being distinct, therefore it is necessary to prove that all objects that are passed in a method call for the method to modify are distinct from each other and from any other objects modified by the method.

Traditional object-oriented languages define variables of class types to obey reference semantics, meaning that when one such variable is assigned the value from another, the two variables end up referring to the same object rather than distinct but identical objects. This makes it very hard to prove that the parameters in method calls are distinct objects.

To avoid this difficulty, the invention defines variables and parameters to obey value semantics by default (although the user is allowed to declare references explicitly where sharing a single object is the required result).

In order to avoid carrying out many expensive copying operations at execution time when assigning variables of class types, and to facilitate generating output code in standard programming languages, value semantics are simulated at run-time using variables that obey reference semantics, as follows.

Variables that are copied from other variables are made to refer initially to the same object. However, when a variable is changed other than by total reassignment, if it is possible that the variable refers to a shared object, the variable is made to refer to a fresh copy of the object before the changes to the object are made. Those sub-objects within the copy that will not be changed immediately may continue to be shared with the corresponding sub-objects in the original, so it is rarely necessary to copy a complete object.

The decision on whether copying is necessary may be made at either of two times:

At translation time; the translator emits instructions to unconditionally perform the copying, unless the translator can determine that the variable being modified cannot possibly share any part with any other live variable;

At execution time; the executing system keeps a reference count in each object and the translator emits instructions to perform the copying only if the reference count at run-time indicates that the object is shared. A small run-time library of classes, methods and macros is provided to facilitate this.

What is claimed is:

1. A computer implemented process for developing mathematically validated object oriented software comprising the steps of:
   a) writing an abstract specification of a class, methods and expected properties of a component of the software, wherein the abstract specification of the methods includes a two-part postcondition such that when one of the methods is overridden by an overriding method in a descendent class one part of the one of the methods is inherited and another part the one of the methods is not inherited by the overriding method;
   b) checking the abstract specification for errors and verifying that the class has the expected properties;
   c) generating executable code for the class from the abstract specification;
   d) running and evaluating the executable code to check that the code meets requirements other than a required speed of performance; and
   e) evaluating the speed of performance when handling data sets commensurate to a size of data sets of the software component is required to handle.

2. A process as claimed in claim 1, wherein step c) of generating executable code includes the further step, where the specification is too complex to generate executable code directly, of refining the method by specifying a series of operations to be undertaken, to produce a refined method and verifying that the refined method behaves in accordance with the abstract specification before generating executable code.

3. A process as claimed in claim 2, wherein the step of refining the method includes providing an algorithm of program statements including postcondition statements.

4. A process as claimed in claim 1, wherein step d) of running and evaluating the executable code, includes the further step, where the code does not meet requirements, of identifying the defects and correcting the abstract specification and then repeating the process from step b).

5. A process as claimed in claim 1, wherein the step e) of evaluating the speed of performance, includes the further steps, where the speed of performance is inadequate, restructuring data maintained by the class, adding variable declarations for the restructured data, and refining the methods and constructors to take account of the restructured data and generating executable code.

6. A process as claimed in claim 1, wherein the step e) of evaluating the speed of performance, includes the further steps, where the speed of performance is inadequate, of refining the method to produce a refined method and verifying that the refined method meets the specifications of original method, and generating executable code.

7. A process as claimed in claim 1, wherein the abstract specification includes a name of the class, a list of other class or classes and/or interfaces that said class inherits from, an abstract model of data maintained by the class, abstract specifications of the methods and constructors of the class, and theorems of expected behaviour of the class and the methods and constructors.

8. A process as claimed in claim 7, wherein the abstract model of data includes declarations of abstract variables and may optionally include class invariants which are conditions concerning values of the abstract variables that are expected always to be true and declarations of abstract methods private to the class that assist in defining the class invariants and what other methods achieve.

9. A process as claimed in claim 7, wherein the abstract specifications of the methods and constructors of the class include: a method name; a method parameter list; and a definition of what the method achieves.

10. A process as claimed in claim 9, wherein the abstract specifications of the methods and constructors of the class further include one or more of a method result type, a precondition that is required to hold whenever the method is called; and a post-assertion description of conditions expected to hold when the method returns.

11. A process as claimed in claim 7, wherein a description of the class is divided into regions: an abstract region containing the abstract data model and also private methods and constructors referred to elsewhere in specifications of the class; an internal region containing re-implemented data and redundant data and also private methods and constructors referred to in re-implementations of other methods; a confined region of methods and constructors that are used only within the class and within other classes that inherit from that class; and an interface region of methods and constructors accessible to any program or components that use instances of the class.

12. A process as claimed in claim 1, wherein the step c) of generating executable code includes the steps of:
   i) tokenizing the abstract specification to form a token stream and building a representation of the abstract specification;
   ii) passing the token stream;
   iii) binding identifiers and operators to declarations;
   iv) converting the specifications contained therein to standard forms;
   v) generating a new instance of each variable at every point at which the variable is changed, effectively replacing each variable by a succession of constants;
   vi) generating proof obligations to represent requirements for program correctness;
   vii) proving the obligations;
   viii) using the abstract specification to generate a test harness or a set of test data for testing speed of performance;
   ix) generating code statements to implement the specification where no code is provided;
   x) translating the code statements to easily translatable form; and
   xi) translating easily translatable form to an output language.

13. A system for developing mathematically validated object oriented software comprising:
   a) means for writing an abstract specification of a class, methods and expected properties of a component of the software, wherein the abstract specification of the methods includes a two-part postcondition such that when one of the methods is overridden by an overriding method in a descendent class one part of the one of the methods is inherited and another part the one of the methods is not inherited by the overriding method;
   b) means for checking the abstract specification for errors and verifying that the class has the expected properties;
   c) means for generating executable code for the class from the abstract specification;
   d) means for running and evaluating the executable code to check that the code meets requirements other than a required speed of performance; and
   e) means for evaluating the speed of performance when handling data sets commensurate to a size of data sets of the software component is required to handle.

14. A system as claimed in claim 13, wherein the means for generating executable code further includes, where the specification is too complex to generate executable code directly, means for refining a method by specifying a series of operations to be undertaken, to produce a refined method and for verifying that the refined method behaves in accordance with the abstract specification before generating executable code.

15. A system as claimed in claim 14, wherein the means for refining the method includes means for providing an algorithm of program statements including postcondition statements.

16. The system as claimed in claim 13, wherein the means for running and evaluating the executable code, further includes, where the code does not meet requirements, for identifying the defects and for correcting the abstract specification and then for repeating checking the abstract specification for errors and verifying that the class has the expected properties.

17. A system as claimed in claim 13, wherein the means for evaluating the speed of performance, further includes, where the speed of performance is inadequate, means for restructuring data maintained by the class, adding variable declarations for the restructured data, and refining the methods and constructors to take account of the restructured data and generating executable code.

18. A system as claimed in claim 13, wherein the means for evaluating the speed of performance, further includes, where the speed of performance is inadequate, means for refining the method to produce a refined method and verifying that the refined method meets the specification of the original method, and generating executable code.

19. A system as claimed in claim 13, wherein the abstract specification includes a name of the class, a list of other class or classes and/or interfaces that said class inherits from, an abstract model of data maintained by the class, abstract specification of the methods and constructors of the class, and theorems of expected behaviour of the class and the methods and constructors.

20. A system as claimed in claim 19, wherein the abstract model of data includes declarations of abstract variables and may optionally include class invariants which are conditions concerning values of the abstract variables that are expected always to be true and declarations of abstract methods private to the class that assist in defining the class invariants and what other methods achieve.

21. A system as claimed in claim 19, wherein the abstract specifications of the methods and constructors of the class include: a method name; a method parameter list; and a definition of what the method achieves.

22. A system as claimed in claim 21, wherein the abstract specifications of the methods and constructors of the class further include one or more of a method result type, a precondition that is required to hold whenever the method is called; and a post-assertion description of conditions expected to hold when the method returns.

23. A statement as claimed in claim 19, wherein a description of the class is divided into regions; an abstract region containing the abstract data model and also private methods and constructors referred to elsewhere in specifications of the class; an internal region containing re-implemented data and redundant data and also private methods and constructions referred to in re-implementations of other methods; a confined region of methods and constructors that are used only within the class and within other classes that inherit from that class; and an interface region of methods and constructors accessible to any program or components that uses instances of the class.

24. A system as claimed in claim 13, wherein the means for generating executable code includes means for:
   xii) tokenizing the abstract specification to form a token stream and building a presentation of the abstract specification;
   xiii) passing the token stream;
   xiv) binding identifiers and operators to declarations;
   xv) converting the specification and expressions contained therein to standard forms;

xvi) generating a new instance of each variable at every point which the variable is changed, effectively replacing each variable by a succession of constants;

xvii) generating proof obligations represent requirements for program correctness;

xviii) proving the obligations;

xix) using the abstract specification to generate a test harness or a set of test data for testing speed of performance;

xx) generating code statements to implement the specification where no code is provided;

xxi) translating the code statements to easily translatable form; and xxii) translating easily translatable form to an output language.

* * * * *